(12) United States Patent
Werner

(10) Patent No.: US 8,485,457 B2
(45) Date of Patent: Jul. 16, 2013

(54) METHOD, DEVICE AND USE OF A DEVICE FOR PRODUCING FUEL FROM MOIST BIOMASS

(76) Inventor: Hans Werner, Munich (DE)

( * ) Notice: Subject to any disclaimer, the term of this patent is extended or adjusted under 35 U.S.C. 154(b) by 351 days.

(21) Appl. No.: 12/990,160

(22) PCT Filed: Apr. 30, 2009

(86) PCT No.: PCT/EP2009/055294
§ 371 (c)(1),
(2), (4) Date: Dec. 9, 2010

(87) PCT Pub. No.: WO2009/133184
PCT Pub. Date: Nov. 5, 2009

(65) Prior Publication Data
US 2011/0089271 A1    Apr. 21, 2011

(30) Foreign Application Priority Data

May 2, 2008   (DE) .......................... 10 2008 021 722
Jul. 29, 2008  (DE) .......................... 10 2008 035 222

(51) Int. Cl.
*B02C 19/00*   (2006.01)
*B02C 25/00*   (2006.01)

(52) U.S. Cl.
USPC ............................................. 241/3; 241/30

(58) Field of Classification Search
USPC ........................................................ 241/3, 30
See application file for complete search history.

(56) References Cited

U.S. PATENT DOCUMENTS

| 4,421,022 A | 12/1983 | Burgin |
| 6,800,319 B1 | 10/2004 | Hulst et al. |
| 2006/0130396 A1* | 6/2006 | Werner .......................... 44/590 |

FOREIGN PATENT DOCUMENTS

| DE | 30 18 039 | 11/1981 |
| DE | 10 2005 053 351 | 5/2006 |
| DE | 10 2005 004 634 | 8/2006 |
| EP | 1 141 450 | 10/2001 |
| GB | 2 419 889 | 5/2006 |
| WO | WO-2004/060868 | 7/2004 |
| WO | WO-2004/067685 | 8/2004 |

* cited by examiner

*Primary Examiner* — Faye Francis
(74) *Attorney, Agent, or Firm* — Jordan and Hamburg LLP

(57) ABSTRACT

The invention relates to a method and to devices, and to the use of the same, for producing fuel pellets from moist biomass of all kinds, wherein the biomass is comminuted, mechanically dehydrated, dried, and then processed into pellets, wherein the comminution is a fine comminution and/or the biomass is washed before or after the comminution—optionally with the water developing during the mechanical dehydration—and is optionally pre-dehydrated and/or heated before the mechanical dehydration step, and is optionally comminuted again after the mechanical dehydration for easier drying.

7 Claims, 1 Drawing Sheet

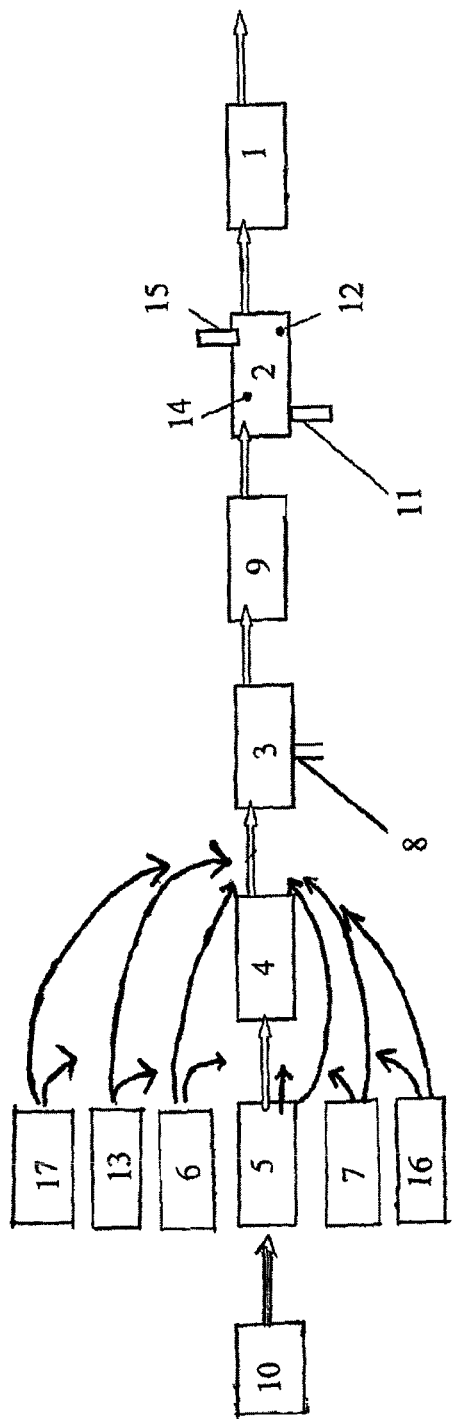

METHOD, DEVICE AND USE OF A DEVICE FOR PRODUCING FUEL FROM MOIST BIOMASS

BACKGROUND OF THE INVENTION

The present invention relates to a method, to a device, and to the use of such a device for producing press-molded fuel made of moist biomass of all types, such as agricultural, forestry and horticultural products, including waste. Examples include grass clippings, nursery or kitchen waste, and waste from the industrial processing of biomass, for example in food processing, paper manufacturing or the like.

Such methods, and devices for carrying out the same, are known, for example, from WO 2004/067685 A1.

These methods comprise, for example, a drying process prior to the final press-molding process that serves to produce the press-molded fuel, a pressing process prior to the drying process so as to reduce the moisture content, and a first comminution process prior to the pressing process, whereby the efficiency of the subsequent pressing operation, which is to say the resulting reduction of the water content of the moist biomass, is increased.

The devices for carrying out these methods are constructed according to the requirements of these methods.

Compared to the conventional dry or largely dry biomass used as fuel, such as wood, or compared to biomass that may have been predried in the field, such as hay, moist biomass has a variety of advantages in terms of processing into fuel. On the one hand, moist biomass is available everywhere in large quantities, often without there being any other use therefor, so that otherwise it would have to be disposed of, for example composted, if it were not processed into fuel or would rot in the field without capturing the energy potential thereof.

Compared to predried biomass, biomass processed in the moist state has the advantage that losses of mass, such as those which occur, for example, due to seeds falling out with field drying, are avoided.

Above all, however, the combustion-related harmful substances, which are present in the biomass and which, like chlorine, for example, accelerate the corrosion of the combustion systems or negatively influence the ash behavior of the combustion material, remain in the biomass when it is dried naturally by evaporation and reduce the value thereof as a fuel. Primarily this disadvantage can be avoided to a significant extent if the moist biomass is compressed using known methods prior to the thermal drying process, so that the water contained therein is removed, along with a significant portion of the harmful substances.

Despite all the advantages thereof, the methods mentioned above, of course, also have disadvantages. Above all, they require large amounts of energy, meaning that they negatively impact the energy balance of the fuel to be produced. This is primarily due to the fact that compressing fresh biomass, such as grasses, which are commonly quite hard, requires considerable force and nonetheless results in insufficient moisture removal, so that the removal still leaves behind a significant moisture content in the material, which has already been compressed, thereby resulting in a particularly energy-consuming thermal drying process. This also means that combustion-related harmful ingredients in the biomass are only removed to a limited extent, because these substances are largely water-soluble and thermal drying does not, therefore, reduce them.

In addition, the considerable forces required for compressing the biomass are associated with major wear on the equipment, which is all the more significant because the biomass frequently contains impurities in the form of matter that increases abrasion, such as sand, inorganic waste and the like, particularly when grass clippings from agricultural or public traffic areas are involved.

This leads to the need for optimizing the known methods and the devices to be used therefor for producing fuels in the form of press-molded biomass made of moist starting material, so as to achieve better heating values and improved fuel properties from the fuel produced, with lower energy expenditure, notably in the thermal drying process, and with the lowest possible strain on the production facilities.

SUMMARY OF THE INVENTION

This need is satisfied by the methods according to the invention having the features described hereinbelow.

In a first embodiment, the solution consists of subjecting the biomass, prior to mechanical dehydration by means of milling, sieving, pureeing, mashing or the like, to a fine comminution process so as to produce a mash/puree/homogeneous pulp, the consistency of which is preferably paste-like to liquid. The comminution process can be carried out in one step or in several steps.

This state, firstly, has the advantage that the biomass can be better further processed, for example it can be pumped (with or without adding additional liquid), and can be fed more easily to subsequent processing steps in the refinement process.

This is accompanied by a change in, or extensive destruction of, the cell structures, and therefore by the discharge of cell fluid and the separation thereof (deposition, pre-dehydration) even before any further mechanical dehydration takes place.

The disrupted cell structures, above all, facilitate the subsequent mechanical dehydration to a fairly significant degree. They not only significantly facilitate the compression step so as to reduce mechanical power expenditure and allow for much higher mechanical moisture reduction, but even allow for the use of alternative mechanical dehydration methods including, for example, the use of filter presses, belt presses, decanters, or centrifuges, which otherwise are not truly effective when the biomass is comminuted into coarser fractions.

If a screw or filter press, or a centrifuge, is used for dehydration, the residual moisture content, which in the case of grass, for example, is about 64-70% with mechanical dehydration according to the known method, is reduced to 30-55%, or even to 30-45% for finely comminuted mass.

In addition, given the disruption of the cell structures and the related increase in the surface of the biomass particles, fine comminution allows for much more effective subsequent drying of the biomass.

The fine comminution removes more water, on an overall basis, from the biomass, mechanically, or even by way of pre-dehydration. This significantly reduces the combustion-related harmful ingredients of the biomass, which would remain to a greater extent in the case of lower (pre-dehydration and) mechanical dehydration, and accordingly provides stronger thermal drying. This leads to reduced corrosion of the boilers, increased heating values, reduced ash content, and an increased ash melting point, which is to say, overall protection of the heating systems to which the fuel that is obtained is supplied. Given this reduction in difficult (explosive) ingredients in terms of the combustion process, the refined biomass can be fed to a variety of boilers, which were not designed in the conventional sense for stalk-like biomass.

Above all, however, this results in a significant improvement in the energy and cost balances of the production method, because as a result of the high mechanical dehydration, the energy expenditure for thermal drying—which requires a lot of energy itself—decreases considerably. To evaporate the same amount of water, mechanical dehydration requires 5-15% of the energy necessary for thermal drying.

In order to support, in particular, the pre-dehydration process, which is to say the process prior to the actual mechanical dehydration, a chemical dehydrating agent, which supports the dehydration process, is preferably employed so as to be added to the biomass.

In an alternative embodiment, the method according to the invention for producing fuel from press-molded biomass containing moist biomass as the starting material provides for the biomass being subjected to a washing process before or after the first comminution. In the process, sediments (rocks, metal, and the like) can be separated. Floating foreign matter, such as plastic, can be collected manually or automatically on the surface of the washing water. The washing water can be recirculated.

It is contemplated that the comminution here does not have to be fine comminution. The washing process as such positively impacts the production process and the product, even at conventional degrees of comminution.

First, the content of components that are disadvantageous in terms of combustion is also reduced by being washed out of the biomass in conjunction with the washing process—similar to the mechanical dehydration. Washing thus improves the combustion behavior and the ash behavior: in particular, the probability of corrosion and the ash melting point, and thus helps to protect the combustion system from detrimental impacts.

This also applies in particular because, during washing, coarse pollutants such as rocks, sand, metals, and environmental pollutants, such as soot emissions and tire particles resulting from abrasion, which are found in street grass clippings, are removed from the biomass, and at the same time the comminution and press devices are protected, because the increased wear that results from such biomass components (which may even make it impossible to carry out the method) is eliminated. This not only improves the cost balance of the method according to the invention, but also results in a more uniform biomass, which in turn has a favorable impact on the combustion process, and thereby leads to an increase in the quality of the product. Washing the biomass is required so that it is possible to refine the biomass as a fuel, regardless of the manner in which it is collected up (such as by suction fans or rakes) or the type of biomass (for example, biomass from agriculture or roadside greenery). Thus, this measure also has an economic advantage. In addition, this provides ecological advantages, because the combustion of harmful substances is prevented.

Finally, the washing process allows for particularly efficient control of the processing temperature, for example such that the temperature of the washing water can be controlled so as to thereby break open the cell structures (blanching/poaching), which in turn facilitates further processing, and notably separation of the water within the biomass (water bound in the biomass).

In a further embodiment of the method according to the invention, the method steps of washing and comminution in the form of fine comminution can be combined with each other. The positive impact of these steps on the flow of the method and on the product will then have a potentiating effect. However, in this case, washing should take place before the fine comminution.

The biomass can be pre-dehydrated prior to mechanical dehydration. This is recommended in particular when the biomass is washed, because the washing water is then removed again in a simple manner and the capacity required of the mechanical dehydration device is reduced. However, pre-dehydration, which can be carried out, for example, by way of a filter, hydraulic, screw, vibration or belt press, a centrifuge, or a decanter, is also particularly important in view of the proposed steps of disintegrating the cell structures, notably by way of fine comminution. This makes it possible to remove a considerable portion of the water without using high levels of mechanical force, which thus lowers the demand on the actual mechanical dehydration process. As a result, this reduces wear and saves energy, and thereby leads to an improvement in energy and cost balances.

It is contemplated for this purpose to heat the biomass prior to the fine comminution or the mechanical dehydration (poaching, blanching).

Heating can be carried out before or after the comminution, for example as early as during washing, by using heated washing water. Temperatures up to 100° degrees are preferred. As an alternative, the heating can also be carried out during comminution and/or before or during the pre-dehydration. The heat for heating, or some amount thereof, can be supplied to the process by way of energy recovery.

Heating also results in better disintegration of the cell structures of the biomass, and therefore facilitates removal of the water, which can thus largely be separated as part of the pre-dehydration, without pressing or with subsequent pressing, for example as part of the mechanical dehydration, and in any case with reduced force and energy expenditure.

Heating also reduces the energy expenditure for the thermal drying process, which in itself, is particularly energy-consuming. This improves the energy balance even further.

Thus, the biogenic fraction in the press water can be varied, depending on the dehydration technique. Due to the improved cell disintegration, heating can lead to an increase in the biogenic fraction in the press water, and thereby increase the value thereof. This effect is amplified by fine comminution, which in turn can result in increased leaching of the biogenic fractions into the press water.

This applies to cases in which the press water is used as fertilizer or is further processed into fertilizer, as well as to cases in which it is used for gas generation. Both the fertilizer value and the gas yield rise as a result of the increase of the biogenic fraction in the press water.

The value of the water separated during mechanical dehydration for the above purposes (as fertilizer, or as a starting material for the production thereof, or for fermentation to produce gas) can be further increased by using it as washing water, which is to say, so that it is enriched multiple times with biogenic material.

Because the biomass, after comminution, after pre-dehydration, and after mechanical dehydration for reduction of the moisture, may be so compacted that it would be difficult to dry it further in this state, it is usually recommended that it be subjected, prior to the thermal drying process, to a second comminution process (loosening process) downstream of the mechanical dehydration process, by which the mass, which has been compacted by the mechanical dehydration, can be loosened again, or it can be further comminuted if necessary.

The invention also relates to devices or apparatus-based structures and to the use thereof for carrying out the methods according to the invention as described below.

A device and the use of a device, for producing fuel from press-molded biomass for carrying out the method comprising a unit for press-molding the biomass; upstream thereof, of a unit for drying the biomass; upstream thereof, a unit for the mechanical dehydration of the biomass, so as reduce the moisture content thereof; and upstream thereof, a first unit for comminuting the biomass, which results in the fine comminution.

A device and the use of a device for producing fuel from press-molded biomass comprising a unit for press-molding the biomass; upstream thereof, a unit for drying the biomass; upstream thereof, a unit for the mechanical dehydration of the biomass so as reduce the moisture content thereof; upstream thereof, a first unit for comminuting the biomass; and upstream or downstream of the latter, a unit for washing the biomass.

A device and the use of a device wherein the first unit for comminuting the biomass produces fine comminution, and wherein the unit for washing the biomass is connected upstream of the comminution unit.

A device and the use of a device wherein a unit for pre-dehydrating the biomass is connected upstream of the unit for mechanical dehydration.

A device and the use of a device which comprises a second unit for comminuting (loosening) the biomass, which is connected upstream of the drying unit and downstream of the unit for mechanical dehydration.

BRIEF DESCRIPTION OF THE DRAWING

The invention will be described in more detail hereinafter based on the single drawing, FIG. 1, which is a diagram illustrating the processes and devices of the invention.

DETAILED DESCRIPTION OF THE INVENTION

FIG. 1 shows a press-molding unit 1 for producing the fuel pellets, upstream of which a drying unit 2 for thermally drying the biomass to be pressed is connected.

The drying unit 2 comprises moisture meters 12 for properly adjusting the desired degree of dryness of the biomass to be pressed, and a temperature sensor 14 for optimally controlling the drying process. In addition, the drying unit 2 comprises a fluid line 11 for discharging moisture that develops and an exhaust gas line 15 for discharging gases that develop during drying.

A unit for mechanical dehumidification (pressing or the like) 3, by means of which as much moisture as possible is mechanically removed from the moist biomass by way of pressing, centrifuging or the like, is connected upstream of the drying unit 2, so as to increase the economy of the thermal drying process, which is considerably more energy-consuming.

The dehumidification unit 3—like the drying unit 2—comprises a fluid line 8, by means of which the waste water that develops during mechanical dehydration can be discharged and optionally supplied for further use. Use as an agricultural fertilizer, or further processing into fertilizer, or fermentation for gas production, are possible further uses.

Since the mechanical dehumidification of the biomass typically leads to compaction of the same, which would make further processing, and more particularly subsequent thermal drying, more difficult, a (second) comminution unit 9 may be provided as a loosening device for the biomass, downstream of the mechanical dehumidification unit 3 and upstream of the thermal drying unit 2.

In any case, the biomass is comminuted in a (first) comminution unit 4 prior to the mechanical dehydration, so as to facilitate mechanical dehumidification thereof and the thermal drying process, as well as further processing thereof. According to one embodiment of the invention, this comminution should be fine comminution.

The biomass is fed to the first comminution unit 4 by the collection unit 10, in which the biomass is stored for the purpose of processing the same. The collection unit can also be designed as a unit for mixing different biomass supplies, or such a mixing unit 16 can be provided separately.

A number of additional units may be provided between the collection unit 10 and the mechanical dehumidification unit 3. These can optionally be connected upstream or downstream—as is indicated by the arrows for reference numerals 5, 6, 7, 13, 16 in the drawing—of the first comminution unit 4:

For example, a unit 13 for separating impurities, such as sand and stones, may be provided downstream or upstream of the first comminution unit 4. It is usually recommended that this be connected upstream of the comminution unit 4, because the equipment for comminution of the same is thereby protected.

In a further embodiment of the invention, a washing unit 5 for washing the biomass may be provided. This may also be connected upstream of the first comminution unit 4—as indicated by the arrows in the drawing—or downstream thereof. The washing step may even be employed as an alternative to the fine comminution. In this case, it is preferably employed after the first comminution, and thus the fine comminution can be foregone. If, in contrast, fine comminution is employed, the washing preferably takes place before the fine comminution, and the system will be designed accordingly. The separation of sand and stones and other coarse impurities then takes place together with the washing process, A pre-dehydration unit 6 may be connected upstream of the mechanical dehumidification unit 3. This unit is used to reduce the load on the downstream dehumidification unit 3 by separating those moisture fractions that can be separated without additional mechanical steps, such as pressing. If the pre-dehydration of biomass which is originally very wet is involved, the pre-dehydration unit 6 may be connected upstream of the first comminution unit 4. However, it may also be provided downstream of the comminution in the first comminution unit 4, or in both locations, in particular when the first comminution is a fine comminution, in which the biomass can be given a paste-like, or even free-flowing, consistency, which allows pre-dehydration without additional mechanical intervention and even makes such a step useful.

So as to support these processes, the biomass may be heated before the mechanical dehydration, for which purpose a heating unit 7 may be provided upstream of the dehumidification unit 3.

Finally, fermentation in a fermentation system 17 for producing gas may be provided upstream of the mechanical dehydration.

The invention claimed is:

1. A method for producing fuel from press-molded biomass, the biomass being moist biomass, the moist biomass being subjected to a drying process prior to the press-molding process, to a mechanical dehydration process for reducing the moisture content prior to the drying process, and to a comminution process prior to the mechanical dehydration process, the biomass being fine-comminuted in the comminution process.

2. The method according to claim 1, wherein the biomass is washed prior to the fine comminution process.

3. The method according to claim 2, wherein the water obtained during the mechanical dehydration process is used as the washing water.

4. The method according to claim 1, wherein the biomass is pre-dehydrated prior to the mechanical dehydration process.

5. The method according to claim 1, wherein the biomass is heated prior to the mechanical dehydration process.

6. The method according to claim 1, wherein the biomass is subjected to a further comminution process for loosening the biomass downstream of the mechanical dehydration process.

7. The method according to claim 1, wherein the biomass is fermented in order to produce gas prior to the mechanical dehydration process, and the water that develops during the mechanical dehydration process is supplied for use as, or for further processing into, agricultural fertilizer.

* * * * *